Sept. 17, 1935.  E. MARTYRER ET AL  2,014,944
HYDRODYNAMIC GEAR
Filed Oct. 8, 1934  2 Sheets-Sheet 2
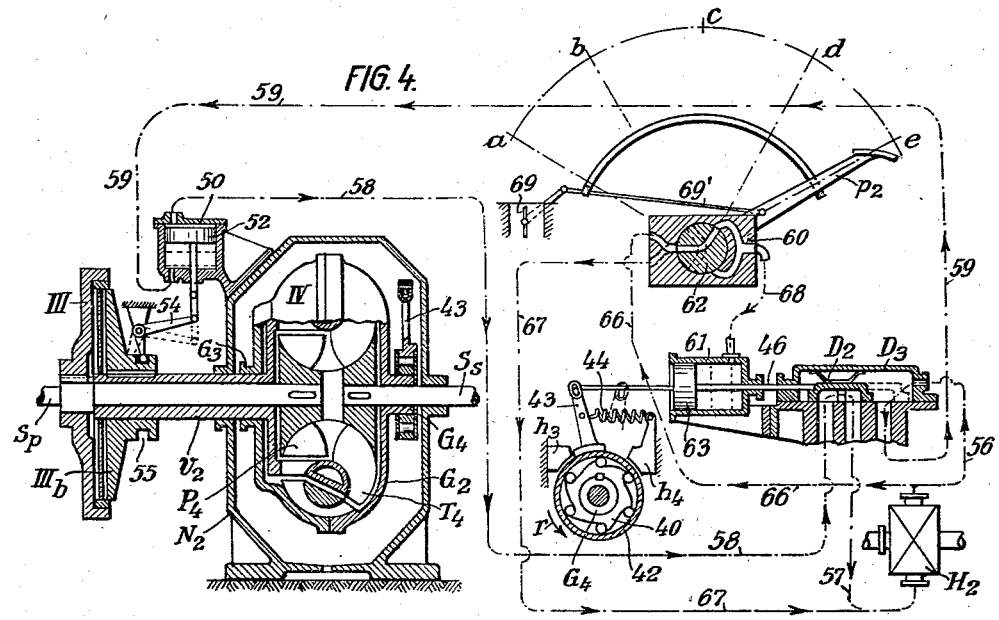
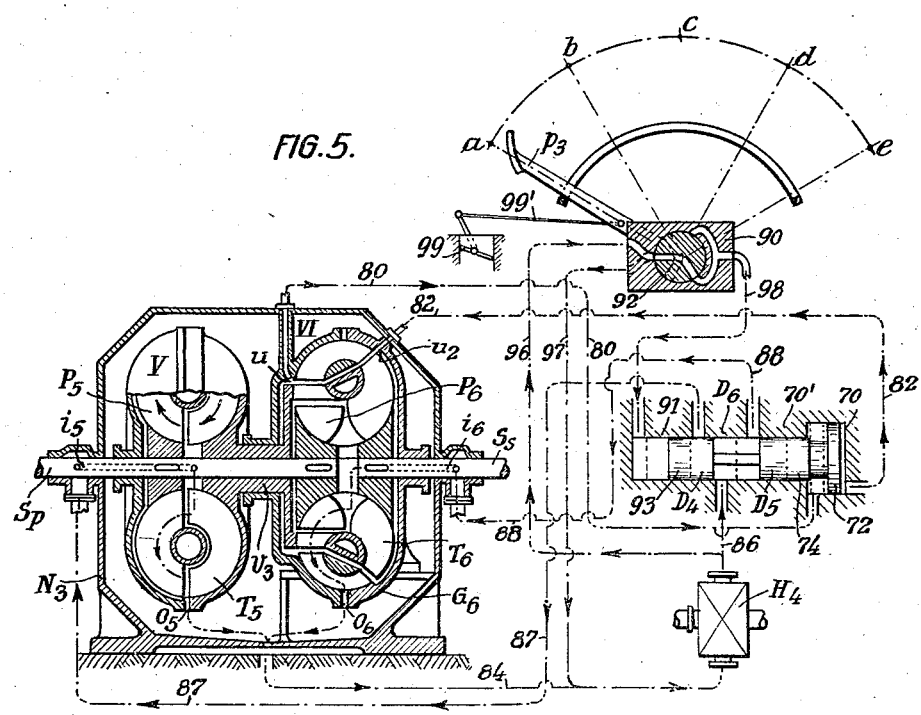
Inventors: Egon Martyrer,
Fritz Obenaus
by Karl Viertel
Attorney Patented Sept. 17, 1935

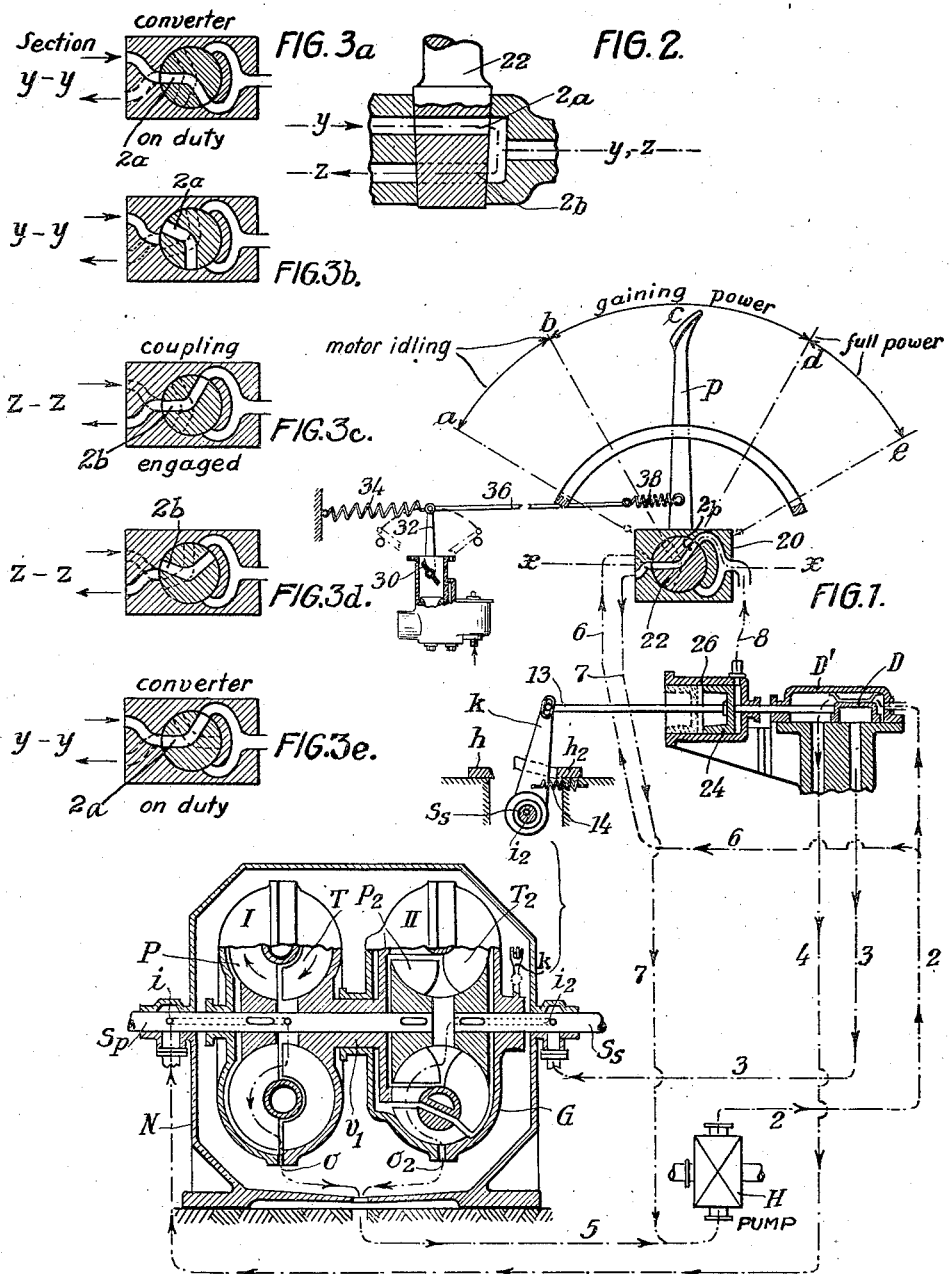

2,014,944

UNITED STATES PATENT OFFICE 2,014,944

HYDRODYNAMIC GEAR

Egon Martyrer, Frankenthal, and Fritz Obenaus, Bad-Durrenberg, Germany, assignors to firm Klein, Schanzlin & Becker Aktiengesellschaft, Frankenthal, Germany Application October 8, 1934, Serial No. 747,397
In Germany June 19, 1933

11 Claims. (Cl. 60—54)

In a companion co-pending United States patent application of ours Ser. Nr. 747,396 filed October 8, 1934, we have described a composite hydrodynamic gear comprising a set of two power transmitters of the Föttinger type, which are co-axially arranged to each other and differ from each other in their individual ratio of gearing, and which are provided with a gear-changing apparatus so designed and cooperatively associated with the said power transmitters, that the latter are automatically thrown reciprocally into and out of gear in response to specific changes of the load, which will cause corresponding changes in the net rotary speed of the secondary shaft or in the ratio of the rotary speed of the secondary shaft to that of the primary shaft of the hydrodynamic set.

The problem dealt with in the said co-pending application is to provide an hydrodynamic gear of improved design, which will show high factors of efficiency under greatly varying loads, and by which the driver of the motor vehicle or the operator in charge of another type of motor driven plant fitted with a composite hydrodynamic gear of the type concerned is wholly relieved from gear changing calculations and manipulations.

The invention disclosed in this present application relates to a similar problem, viz. providing a composite hydrodynamic gear of improved design, comprising a torque converter of the Föttinger type and a releasable coupling or clutch, which may be of any convenient type,—which will show equally high factors of efficiency under greatly varying loads as described in detail in our co-pending application.

In addition thereto this invention aims at providing the said composite hydrodynamic gear with a gear changing apparatus, which will automatically throw out of operation the torque converter, while the coupling is simultaneously thrown into engagement, namely in response to specific changes of the load incidentally causing corresponding changes of the torque acting upon the bladed guide member of the torque converter and corresponding changes of the ratio of the hydrostatic pressure prevailing within the torque converter at a fixed point to that at another fixed point, which is at a distance from the former.

Consistent therewith the invention aims at providing manually operable gear changing means, which are under the control of the operator and enable the latter to re-engage the torque converter at any time, while the coupling is simultaneously released.

A further object of the invention, closely related to the former, is to so design those manually operable gear changing means, that the working of the motor can be controlled by the operator, while the torque converter is simultaneously re-engaged.

Other objects of the invention will become incidentally apparent hereinafter to practitioners in this field.

The nature and scope of the invention are briefly outlined in the appended claims and will be more fully understood from the following specification taken together with the accompanying drawings, in which Fig. 1 is a sectional lay-out diagrammatically showing by way of an example a composite hydrodynamic gear comprising a converter and a coupling of the Föttinger type, which are fitted with a gear-changing apparatus according to this invention, Fig. 2 is a cross section taken on line $x$—$x$ in Fig. 1, and showing in a larger scale a foot operated plug-cock designed according to this invention, Figs. 3a to 3e are other cross sections taken on lines $y$—$y$ and $z$—$z$ in Fig. 2 and showing the plug-cock in five characteristic positions, Figs. 4 and 5 are lay-outs diagrammatically showing by way of other examples composite hydrodynamic gears having structurally modified gear-changing apparatus, which are designed according to this invention.

The invention described in the co-pending application of ours referred to above relates to and is based upon a purely hydrodynamic composite gear, comprising a set of two power transmitters of the Föttinger type, viz. a converter and a coupling or two converters, which differ from each other in their individual ratio of gearing;—said power transmitters are provided with a self-acting gear-changing apparatus by which they are automatically thrown into and out of gear reciprocally in response to specific changes of the load causing corresponding changes in the rotary net speed of the secondary shaft and in the ratio of the rotary speed of the secondary shaft to that of the primary shaft.

The invention forming the subject matter of this companion application relates to a composite hydrodynamic gear, one of the power transmitters of which is a torque converter of the Föttinger type, while the other power transmitter is a releasable coupling—not necessarily being of the Föttinger or another specific type—but of any convenient design.

In the embodiment of this invention shown by way of examples in Figs. 1 and 5 said couplings designated I, V are indeed of the hydrodynamic Föttinger type, to be thrown into and out of gear by filling thereinto and withdrawing therefrom the working liquid; while the hydrodynamic gear shown in Fig. 4 comprises in addition to a torque converter IV a coupling designated III of the friction disk clutch type as proposed for instance in United States Patent 1,298,990 to Mason.

In contradistinction to Mason's hydrodynamic gear, the friction clutch of which must be thrown into and out of engagement by the operator, the hydrodynamic gear described hereinafter is fitted with a semi-automatic gear-changing apparatus comprising a hydraulic relay, by which the torque converter is spontaneously thrown out of gear, while the coupling is thrown into engagement in response to specific changes of the load, and a switching mechanism under the control of the operator, enabling the latter to re-engage the converter at any time, while concurrently disengaging the coupling.

In the embodiments of the invention shown in Figs. 1 and 4 the said hydraulic relay is designed to react in response to specific changes of the torque acting upon the bladed rim of the guide members G, G₂, while the hydraulic relay shown in Fig. 5 is designed to react upon specific changes of the ratio of the pressure of working fluid at two different points of the torque converter—all said changes being the result of corresponding primary changes of the load.

Referring now more in detail to the other component parts and the manner of working of the hydrodynamic gear shown in Fig. 1, said gear comprises (1.) a coupling I and torque converter II, which are coaxially arranged to each other so as to form a unit, the impeller wheels P, P₁ being keyed to the primary (driving) shaft Sp; a sleeve V₁ is attached to and interconnects the turbine wheels T, T₂, of which T₂ is keyed to the secondary (driven) shaft Ss; G is the bladed guide member of the converter, which encloses its impeller and turbine wheels and is journaled on the said sleeve V₁ and on the secondary shaft, so as to be capable of performing rocking motions within a fixed range, limited by stops h, h₂, against which a spring loaded lever k strikes, which is keyed to the guide member G; the latter will be rocked and thereby act as an automatic relay, whenever the torque acting upon its bladed rim changes its direction as the result of specific changes of the load on the secondary shaft Ss, (2.) a liquid distribution device having a slide valve D, which is enclosed in a casing D', the latter being connected by a system of pipes, indicated by dot and dash lines 2, 3, 4, with a pump H for circulating the working liquid, and with intake channels i, i2, which are provided at the coupling I and the torque converter II; the intake of said pump H is connected by another pipe 5 with a tank N enclosing both power transmitters I and II and collecting the working liquid discharged therefrom. The said stops h, h2 limiting the rocking movements of lever k are fixed within said tank. When lever k and the valve D are in the position shown in Fig. 1 the torque converter II is out of gear, the current of the working liquid flowing through pipes 2 and 4 in the direction of the arrows to the coupling I; the liquid discharged through outlet port o (or o2) is collected in the tank and returns through pipe 5 into the pump H;

(3.) a hydraulic switching mechanism under the control of the operator for re-engaging the converter II and disengaging the coupling I; the principal element of said switching mechanism is a three-way plug-cock 20, 22, to the plug of which a foot pedal p is attached; said plug-cock is connected by pipes 6, 7 to pipes 2 and 5 leading to the delivery port and intake of the pump H; connecting-rod 13 of valve D has attached to it a piston 24, which is slidably fitted in a cylinder 26, the latter being connected with the plug-cock through a pipe 8.

As seen best in Fig. 2 the plug 22 has two curved channels 2a, 2b spaced from each other and being angularly displaced relatively to each other for communication with the passages within the outer shell 20 of the cock. The co-operation of the plug-cock with the liquid distribution device is as follows:

On turning the plug 22 by the pedal p into the position shown in Fig. 3a and being marked "a" in Fig. 1 the current of working liquid will pass through pipe 8 into the cylinder 26 in front of the piston and will push the latter into its rearward position indicated by dotted lines in Fig. 1—thereby directing the working liquid through pipe 3 into the converter II, which is thus re-engaged, while the coupling I is concurrently disengaged.

On turning the plug 22 through the position marked b into the position identified by letter c the working liquid is free to pass out of the cylinder 26; meanwhile lever k aided by a spring 14 returns into its original position, shown in full lines in Fig. 1, in which the coupling is engaged.

On further turning the plug 22 until it reaches the position e the working liquid is again admitted into the cylinder 26 with the result, that the liquid distribution valve D is pulled back, the passage for the liquid to re-enter through pipe 3 the converter is opened and the latter re-engaged.

It will be noted, that in both extreme positions "a" and "e" of the plug 22 the converter is in gear, while the coupling is disengaged:

This is an important feature in as much as it lends the switching mechanism described to be cooperatively associated in a direct and structurally simple manner with means—such as a throttle valve—for controlling simultaneously the output of an internal combustion motor or another prime-mover and the working of the hydrodynamic gear concerned.

In Fig. 1 a throttle valve 30 as used for controlling the fuel supply to a motor is shown, the actuating lever 32 of which is capable of being swung to and fro between two extreme positions and is loaded by a spring 34; said lever 32 is linked by means of a connecting rod 36 and another spring 38 to the foot pedal p of the switching mechanism:

The tension of said springs 34, 38 should be so chosen, that while the pedal p moves from position "a" to position "b" or back the throttle valve 30 remains in its "idling" position viz. allowing the motor to keep running at low speed.

On turning the pedal p from the position b to position c the throttle valve is gradually opened, while the motor gains speed with the result that the converter automatically throws itself out of gear, while the coupling is concurrently engaged.

On proceeding from the position c to position d the throttle valve will then admit fuel to its fullest extent to the motor, which accordingly develops its maximum power.

Supposing that at this juncture a vehicle driven by said motor arrives at an uphill section of the road, for which the torque developed by the motor would be insufficient, the driver noticing that the motor begins to slow down can at a moments notice re-engage the converter and disengage the coupling by pushing the pedal $p$ into the extreme position $e$.

On reviewing the above described interwoven functional features of the gear-changing apparatus and the power controlling means of the motor it will become apparent, that the hydrodynamic gear is always ready to do its best consistent with the load and the output of the motor.

Referring now to the embodiment of the invention shown in Fig. 4, the hydrodynamic gear comprises the following elements:

(1.) A coupling III of the friction disk type and a torque converter IV, which are coaxially arranged so as to form a unit; the driving element of the coupling and the impeller wheel P4 of the converter are keyed to the primary shaft $Sp$; a sleeve V2 is attached to and interconnects the driven element IIIb of the coupling and the turbine wheel T4 of the converter; the latter is keyed to the secondary shaft $Ss$; the bladed guide member G2 of the converter encloses the impeller and turbine wheels P4, T4 and is rotatably mounted on said sleeve V2 and the secondary shaft by means of a collar G3 and a hub G4; to the latter is keyed the inner member 40 of a self-gripping clutch of the roller and incline slot type acting in the direction of arrow $r$, the outer member 42 of which carries a lever 43 loaded by a spring 44, said lever capable of performing rocking movements jointly with the member 42; the converter is enclosed by a stationary casing N2, formed with two stops $h3$, $h4$, which limit the rocking movements of said lever 43; the latter is swung around in the direction of the arrow $r$ and is kept in contact with the stop $h3$, whenever the converter IV is in gear, viz. by reason of the differential torque acting upon the guide member G2; on fading of said torque in consequence of specific changes of the load on the secondary shaft the guide member ceases to react upon lever 43, which thereupon is pulled by the spring 44 against stop $h4$ with the result, that guide member G2 is disengaged and free to rotate, while the coupling is thrown into engagement by (2.) a self-acting gear-changing mechanism; the latter comprises:

An auxiliary working fluid under pressure delivered from a source, which is diagrammatically indicated at H2 and which may be conveniently a pump and a tank, in which the fluid is stored, a valve D2 enclosed in a casing D3 for distributing said working fluid, a rod 46 connecting valve D2 with the lever 43, a cylinder 50 having a piston 52 slidably fitted therein, which is cooperatively associated by means of piston rod and a bell crank lever 54 with a grooved sleeve 55, with which the driven element IIIb of the coupling is formed; pipes 56, 57 connecting the casing D3 with the said source H2 of fluid under pressure and pipes 58, 59, leading the fluid from casing D3 to both ends of cylinder 50.

While the converter IV is in gear, the valve D2 is drawn by lever 43 into the position at the left, shown in Fig. 4 in full lines; the fluid entering the casing D through pipe 56 will then proceed through pipe 59 to the lower end of cylinder 50 raising piston 52 and disengaging the coupling III, while the fluid on top of piston 52 passes out of the cylinder through pipe 58; the direction in which the fluid flows through said pipes on disengaging the coupling is indicated in the drawings by arrows.

When in consequence of specific changes of the load the guide member G2 of the converter ceases to react upon the lever 43 the lever is swung around by spring 44 as indicated by dotted lines and shifts the valve D2 into the position shown also in dotted lines, in which the direction of the fluid current passing through pipes 58, 59 is reversed and the coupling III thrown into engagement.

The re-engagement of the converter and disengagement of the coupling is accomplished by (3.) a fluid operated gear changing or switching mechanism under the control of the operator and comprising in the embodiment of the invention shown by way of an example a three-way plug-cock 60, 62, to the cock 62 of which is a foot treadle $p2$ is attached; an auxiliary cylinder 61 and a piston 63 which is attached to valve rod 46; pipes 66, 67, 68, by which said plug-cock is connected with cylinder 61 and with the source H2 of fluid under pressure.

The structural design and the cooperation of said plug-cock 60, 62 with the foot treadle $p2$, cylinder and piston, valve D2 and other accessorial parts are fully identical to that described above in connection with Figs. 1-3 and need not be repeated. The different characteristic positions of the plug 62 and the foot treadle $p2$ marked in Fig. 4 also by dot and dash lines and by the letters $a$, $b$, $c$, $d$, $e$ exactly correspond to those shown in Fig. 1.

In the same manner, for the same purpose and by the identical structural elements as shown in Fig. 1 and described hereinbefore the plug 62 may be conveniently associated cooperatively with a throttle valve or kindred device for controlling the output by a prime-mover; in Fig. 4 a throttle valve and link interconnecting the latter with the plug are suggestively indicated at 69, 69' in a small scale.

Referring now to the embodiment of the invention shown by way of an example in Fig. 5, the hydrodynamic gear comprises:

(1.) A set of two power transmitters, which consists of a coupling V and a torque converter VI, both being of the Föttinger type and being coaxially associated so as to form a unit; the impeller wheels P5 and P6 of said power transmitters are keyed to the primary shaft $Sp$; a sleeve V3 is attached to and interconnects their turbine wheels T5, T6, of which T6 is keyed to the secondary shaft $Ss$; G6 is the guide member of the torque converter VI, which is stationarily fixed within a casing N3 enclosing both power transmitters V, VI; the latter are provided with intake channels $i5$, $i6$ and discharge ports $o5$, $o6$, through which the working liquid enters and passes out of the transmitters;

(2.) A self-acting gear-changing apparatus which comprises: A hydraulic relay in the form of a differential pressure cylinder composed of two sections of different diameter, diagrammatically indicated at 70, 70', a piston 72 and a plunger 74 slidably fitted in said cylinder; pipes 80, 82 connecting said cylinder with two different points $u$, $u2$ of the liquid circuit within the converter; a pump H4 for positively circulating the working liquid through the power transmitters V, VI, which is drawn into the pump through pipe 84; a liquid distribution device, which is composed of a casing D6, the latter being conveniently integral with cylinder 70, 70' and of two cylindrical valves D4, D5, which are slidably fitted in said casing and are spaced from each other by a distance rod; valve D5 is shown as being integral with the plunger 74; both valves are thus adapted for being jointly actuated by the differential pressure upon both sides of piston 72, viz. in response to specific changes in the ratio of the hydrostatic pressure of the working liquid at point $u$ to that at point $u2$, said changes being caused by corresponding changes of the load on the secondary shaft $Ss$; pipes 86, 87, 88 indicated by dot and dash lines connect casing D6 with the delivery end of pump H3 and the intake channels i5, i6 of the power transmitters.

The difference of the diameters of the piston 72 and of the plunger 74 is so chosen, that as long as the converter VI is on duty, the differential hydrostatic pressure acting upon both sides of the piston 72 will cause the valves D4, D5 to remain in their extreme right position, shown in Fig. 5 in full lines; when the said differential pressure goes beyond a specific limit consistent with the individual working characteristics of the converter the valves D4, D5 are thrown into the other extreme position, indicated by dotted lines, with the result, that the current of working liquid is directed through pipe 87 into the coupling V, which is thereby thrown into gear, while the converter is disengaged;—the re-engagement of the converter VI and the disengagement of the coupling V is accomplished by (3.) An auxiliary hydraulic gear-changing or switching mechanism under the control of the operator, which comprises in the embodiment of the invention shown by way of an example: A three-way plug-cock 90, 92, to the cock 92 of which a foot treadle $p3$ is attached; an auxiliary cylinder, diagrammatically indicated at 91 and being integral with casing D6, and a piston 93, which is integral with valve D4; pipes 96, 97, 98, by which said plug-cock is connected with pump H4 and with the pump cylinder 91.

The structural design and the cooperation of said plug-cock 90, 92 with the foot treadle $p3$, cylinder 91 and piston 93, valve D4, D5 and other accessorial parts are fully identical to that described above in connection with Figs. 1-3 and need no further comment.—The different characteristic positions of the plug 92 and the foot treadle $p3$ also by dot and dash lines and by the letters $a, b, c, d, e$ exactly correspond to those shown in Figs. 1 and 3.

In the same manner, for the same purpose and by the identical structural elements as shown in Fig. 1 and described hereinbefore the plug 92 may be conveniently associated cooperatively with a throttle valve or kindred device for concurrently controlling the output of a prime-mover, by which the hydrodynamic gear is actuated, and also the manner of gearing of the latter; in Fig. 5 a throttle valve and link interconnecting the throttle valve with the plug are suggestively indicated at 99, 99' in a reduced scale.

Various other changes and modifications in the structural details of automatic gear changing apparatus as applied to composite hydrodynamic sets of the type set forth may be made, without substantially departing from the spirit and the salient ideas of this invention.

What we claim is:
1. In a composite hydrodynamic gear the combination with a torque converter of the Föttinger type, comprising an impeller wheel and a turbine wheel, of a releasable coupling for interconnecting rotary shafts comprising a driving element and a driven element,—a primary shaft, to which the impeller wheel of the converter and the driving element of the coupling are keyed, a sleeve attached to and interconnecting the turbine wheel of the converter and the driven element of the coupling, a secondary shaft, to which the turbine wheel of the converter is keyed, a stationary bladed guide member enclosing the impeller and turbine wheels of the converter, a gear changing apparatus including a hydraulic relay and a liquid distributing device, which are adapted to spontaneously cut off the liquid supply to the torque converter to thus render the latter ineffective, while the coupling is thrown into operation in response to specific changes of the load, and a hydraulic switching mechanism under the control of the operator, enabling the latter to re-engage the converter and disengage the coupling.

2. A composite hydrodynamic gear having the features outlined in claim 1, in which said coupling is also of the Föttinger type, and in which the guide member of the torque converter is adapted to perform rocking movements around the central axis of symmetry in response to changes of the direction of the differential torque acting upon its bladed rim, said hydraulic relay comprising a pump for circulating the working liquid of the hydrodynamic gear, intake channels and discharge ports for the working liquid provided at the converter and the coupling, a liquid distributing valve adapted to direct current of the working liquid alternatively through the converter or the coupling, a system of pipes and a tank, interconnecting said valve, pump, intake channels and discharge ports, and valve actuating means cooperatively interconnecting said valve and the guide member of the torque converter.

3. A composite hydrodynamic gear having the features outlined in claim 1, in which said coupling is also of the Föttinger type, and in which the guide member of the torque converter is adapted to perform rocking movements around the central axis of symmetry in response to changes of the direction of the differential torque acting upon its bladed rim, said hydraulic relay comprising a pump for circulating the working liquid of the hydrodynamic gear, intake channels and discharge ports for the working liquid provided at the converter and the coupling, a liquid distributing valve adapted to direct current of the working liquid alternatively through the converter or the coupling a system of pipes and a tank, interconnecting said valve, pump, intake channels and discharge ports, and valve actuating means cooperatively interconnecting said valve and the guide member of the torque converter,—said hydraulic switching mechanism comprising a cylinder, a piston slidably fitted therein and being attached to said valve actuating means, a three-way plug-cock, a handle for rocking the plug of said cock and a system of pipes interconnecting said cock, cylinder and pump.

4. A composite hydrodynamic gear having the features outlined in claim 1, in which said coupling is also of the Föttinger type, and in which the guide member of the torque converter is adapted to perform rocking movements around the central axis of symmetry in response to changes of the direction of the differential torque acting upon its bladed rim, said hydraulic relay comprising a pump for circulating the working liquid of the hydrodynamic gear, intake channels and discharge ports for the working liquid provided at the converter and the coupling, a liquid distributing valve adapted to direct current of the working liquid alternatively through the converter or the coupling a system of pipes and a tank, interconnecting said valve, pump, intake channels and discharge ports, and valve actuating means cooperatively interconnecting said valve and the guide member of the torque converter,—said hydraulic switching mechanism comprising a cylinder, a piston slidably fitted therein and being attached to said valve actuating means, a three-way plug-cock, a lever for rocking the plug of said cock and a system of pipes interconnecting said cock, cylinder and pump,—said plug having two curved channels, which are spaced from each other and are arranged in staggered position to each other, throttle means being provided, which are adapted to control the output of a prime mover, driving the primary shaft, and are cooperatively connected with said plug and lever.

5. A composite hydrodynamic gear having the features outlined in claim 1, in which said releasable coupling is of the friction clutch type, and in which the guide member of the torque converter is adapted to perform rocking movements around the central axis of symmetry in response to changes of the direction of the differential torque acting upon its bladed rim, said hydraulic relay comprising a pump for circulating under pressure an auxiliary liquid substance in a closed circuit, a cylinder having a piston slidably fitted therein, which is cooperatively connected with the said coupling, so as to engage and disengage the latter, a liquid distribution valve for directing the circulated liquid to said cylinder, pipes interconnecting said valve with both ends of said cylinder and with the said pump, and valve actuating means cooperatively interconnecting said valve and the guide member of the torque converter.

6. A composite hydrodynamic gear having the features outlined in claim 1, in which said releasable coupling is of the friction clutch type, and in which the guide member of the torque converter is adapted to perform rocking movements around the central axis of symmetry in response to changes of the direction of the differential torque acting upon its bladed rim, said hydraulic relay comprising a pump for circulating under pressure an auxiliary liquid substance in a closed circuit, a cylinder having a piston slidably fitted therein, which is cooperatively connected with the said coupling, so as to throw into and out of engagement the latter, a liquid distribution valve for directing the circulated liquid to said cylinder, pipes interconnecting said valve with both ends of said cylinder and with the said pump, and valve actuating means cooperatively interconnecting said valve and the guide member of the torque converter,—said valve actuating means comprising a rocking lever, a self-acting locking and unlocking device adapted to interlock said lever with the guide member of the converter in response to rocking motions of the latter in one direction of rotation and to allow the said guide member to freely rotate in the opposite direction, while the converter is out of gear.

7. A composite hydrodynamic gear having the features outlined in claim 1, in which said releasable coupling is of the friction clutch type, and in which the guide member of the torque converter is adapted to perform rocking movements around the central axis of symmetry in response to changes of the direction of the differential torque acting upon its bladed rim, said hydraulic relay comprising a pump for circulating under pressure an auxiliary liquid substance, a cylinder having a piston slidably fitted therein, which is cooperatively connected with the said coupling, so as to engage and disengage the latter, a liquid distribution valve for directing the circulated liquid to said cylinder, pipes interconnecting said valve with both ends of said cylinder and with the said pump and valve actuating means cooperatively interconnecting said valve and the guide member of the torque converter,—said hydraulic switching mechanism comprising another cylinder, a piston slidably fitted therein and being attached to said valve actuating means, a three-way plug-cock, a lever for rocking the plug of said cock and a system of pipes interconnecting said cock, cylinder and pump.

8. A composite hydrodynamic gear having the features outlined in claim 1, in which said releasable coupling is of the friction clutch type, and in which the guide member of the torque converter is adapted to perform rocking movements around the central axis of symmetry in response to changes of the direction of the differential torque acting upon its bladed rim, said hydraulic relay comprising a pump for circulating under pressure an auxiliary liquid substance, a cylinder having a piston slidably fitted therein, which is cooperatively connected with the said coupling, so as to engage and disengage the latter, a liquid distribution valve for directing the circulated liquid to said cylinder, pipes interconnecting said valve with both ends of said cylinder and with the said pump and valve actuating means cooperatively interconnecting said valve and the guide member of the torque converter,—said hydraulic switching mechanism comprising another cylinder, a piston slidably fitted therein and being attached to said valve actuating means a three-way plug-cock, a lever for rocking the plug of said cock, and a system of pipes interconnecting said cock, cylinder and pump,—said plug having two curved channels, which are spaced from each other and are arranged in staggered position to each other, throttle means being provided, which are adapted to control the output of a prime mover driving the primary shaft, and are cooperatively connected with said plug and lever.

9. A composite hydrodynamic gear having the features outlined in claim 1, in which said coupling is of the Föttinger type, in which the guide member of the torque converter is stationarily fixed, and in which said hydraulic relay comprises a pump for circulating under pressure the working liquid of the hydrodynamic gear, intake channels and discharge ports provided at the latter, a tank enclosing the hydrodynamic gear for collecting the liquid discharged therefrom, a liquid distribution valve adapted to direct a current of the liquid alternatively through the converter or the coupling, a system of pipes interconnecting said valve, pump, tank and intake channels, a differential pressure cylinder having a piston slidably fitted therein, and pipes puting into communication the spaces within said cylinder at both sides of the piston with two spaced points within the torque converter.

10. A composite hydrodynamic gear having the features outlined in claim 1, in which said coupling is of the Föttinger type, in which the guide member of the torque converter is stationarily fixed, and in which said hydraulic relay comprises a pump for circulating under pressure the working liquid of the hydrodynamic gear, intake channels and discharge ports provided at the latter, a tank enclosing the hydrodynamic gear for collecting the liquid discharged therefrom, a liquid distribution valve adapted to direct a current of the liquid alternatively through the converter or the coupling, a system of pipes interconnecting said valve, pump, tank and intake channels, a differential pressure cylinder having a piston slidably fitted therein, and pipes putting into communication the spaces within said cylinder at both sides of the piston with two spaced points within the said guide member of the torque converter,—said liquid distribution valve being made in two cylindrical portions, which are slidably fitted in a casing, the edges of the latter which control the distribution of the liquid being opposed to each other, the piston of said differential pressure cylinder having a plunger, which is attached to the said distribution valve.

11. A composite hydrodynamic gear having the features outlined in claim 1, in which said coupling is of the Föttinger type, in which the guide member of the torque converter is stationarily fixed, and in which said hydraulic relay comprises a pump for circulating under pressure the working liquid of the hydrodynamic gear, intake channels and discharge ports provided at the latter, a tank enclosing the hydrodynamic gear for collecting the liquid discharged therefrom, a liquid distribution valve adapted to direct a current of the liquid alternatively through the converter or the coupling, a system of pipes interconnecting said valve, pump, tank and intake channels, a differential pressure cylinder having a piston slidably fitted therein, and pipes putting into communication the spaces within said cylinder at both sides of the piston with two spaced points within the said guide member of the torque converter,—said hydraulic switching mechanism comprising a cylinder, having a piston and plunger slidably fitted therein, which is attached to said liquid distribution valve, a three-way plug-cock, a lever for rocking the plug of said cock and a system of pipes interconnecting said cock, cylinder and pump, said plug having two curved channels, which are spaced from each other and angularly displaced to each othed.

EGON MARTYRER.
FRITZ OBENAUS.